(12) United States Patent
Dang et al.

(10) Patent No.: US 12,489,343 B2
(45) Date of Patent: Dec. 2, 2025

(54) OIL WARMING SYSTEM AND METHOD FOR AN ELECTRIC MOTOR

(71) Applicant: Rivian IP Holdings, LLC, Plymouth, MI (US)

(72) Inventors: Dang Dinh Dang, Garden Grove, CA (US); Venkata Harish Kunatharaju, Irvine, CA (US)

(73) Assignee: Rivian IP Holdings, LLC, Irvine, CA (US)

( * ) Notice: Subject to any disclaimer, the term of this patent is extended or adjusted under 35 U.S.C. 154(b) by 0 days.

(21) Appl. No.: 17/507,255

(22) Filed: Oct. 21, 2021

(65) Prior Publication Data
US 2023/0129134 A1 Apr. 27, 2023

(51) Int. Cl.
*H02K 9/19* (2006.01)
*H02K 1/20* (2006.01)
*H02K 5/20* (2006.01)
*H02K 11/25* (2016.01)

(52) U.S. Cl.
CPC ............... *H02K 9/19* (2013.01); *H02K 1/20* (2013.01); *H02K 5/203* (2021.01); *H02K 11/25* (2016.01)

(58) Field of Classification Search
CPC ............ H02K 1/20; H02K 5/203; H02K 9/19; H02K 11/25
See application file for complete search history.

(56) References Cited

U.S. PATENT DOCUMENTS

| | | | |
|---|---|---|---|
| 7,834,492 B2 * | 11/2010 | Iund | H02K 9/19 310/58 |
| 2004/0161340 A1 * | 8/2004 | Rimkus | F04B 49/20 417/43 |
| 2011/0156508 A1 * | 6/2011 | Minemura | H02K 9/19 310/54 |
| 2012/0200241 A1 * | 8/2012 | Kojima | B60L 58/25 318/139 |
| 2013/0002173 A1 * | 1/2013 | Baglino | B60L 58/25 318/139 |
| 2013/0086909 A1 * | 4/2013 | Wang | F02C 9/36 60/730 |
| 2015/0044036 A1 * | 2/2015 | Fitzpatrick | F02C 7/14 184/6.1 |

(Continued)

FOREIGN PATENT DOCUMENTS

JP  2017189051 A * 10/2017 ............. B60L 15/20

OTHER PUBLICATIONS

Inokuma (JP 2017189051 A) English Translation (Year: 2017).*

*Primary Examiner* — Christopher M Koehler
*Assistant Examiner* — Robert E Mates
(74) *Attorney, Agent, or Firm* — BAKERHOSTETLER

(57) ABSTRACT

Various disclosed embodiments include oil warming systems, electric motors, and vehicles. In an illustrative embodiment a system includes an oil reservoir, a motor stator, and an oil pump. The oil reservoir is configured to hold oil therein. The motor stator is positioned such that at least a portion thereof is positioned within the oil reservoir where the at least the portion of the motor stator is in thermal communication with the oil while the oil reservoir includes the oil therein. The motor stator is configured to warm the oil while in an oil warming mode. The oil pump is fluidly coupled to the oil reservoir and is configured to draw oil out of the oil reservoir.

6 Claims, 9 Drawing Sheets

(56) References Cited

U.S. PATENT DOCUMENTS

| | | | | |
|---|---|---|---|---|
| 2015/0275715 A1* | 10/2015 | Nagata | ............... | F16C 33/6659 |
| | | | | 184/6 |
| 2016/0178548 A1* | 6/2016 | Berry | ..................... | F28D 15/00 |
| | | | | 374/138 |
| 2020/0244123 A1* | 7/2020 | Kang | ....................... | H02K 9/19 |
| 2021/0351732 A1* | 11/2021 | Shen | .................. | H01M 10/637 |

* cited by examiner

OIL WARMING SYSTEM AND METHOD FOR AN ELECTRIC MOTOR

INTRODUCTION

The present disclosure relates to warming oil for an electric motor. The statements in this section merely provide background information related to the present disclosure and may not constitute prior art.

In an electric motor environment, an electric oil pump typically is used to provide oil flow rate to meet the demand of cooling and lubrication, however at startup in low temperatures high oil viscosity not only requires more power consumption from the electric pump to overcome system impedance but also can limit the amount of flow and pressure capacity due to the finite power, flow, pressure, and capability of the electric pump. Current approaches use high pump power along with filter grading to overcome system impedance at low oil temperatures to overcome the pressure drop.

The present background is provided by way of illustrative environmental context only. It will be readily apparent to those of ordinary skill in the art that the principles of the present disclosure may be implemented in other environmental contexts equally.

BRIEF SUMMARY

Various disclosed embodiments include oil warming systems, electric motors, and vehicles.

In an illustrative embodiment an electrical motor system includes an oil reservoir, a motor stator, and an oil pump. The oil reservoir is configured to hold oil therein. The motor stator is positioned such that at least a portion thereof is positioned within the oil reservoir where at least a portion of the motor stator is in thermal communication with the oil while the oil reservoir includes the oil therein. The motor stator is configured to warm the oil while in an oil warming mode. The oil pump is fluidly coupled to the oil reservoir and is configured to draw oil out of the oil reservoir.

In another illustrative embodiment an electric motor includes a motor stator and a motor rotor configured to rotate relative to the motor stator. An oil reservoir is configured to hold oil therein such that a portion of the motor stator is in thermal communication with the oil while the oil reservoir include the oil therein. The motor stator is electrically couplable to receive electrical power in an oil warming mode. The motor stator is configured to increase a temperature of the oil while in the oil warming mode. An oil pump is fluidly coupled to the oil reservoir and configured to draw oil out of the oil reservoir. At least one oil sprayer may be coupled to the oil pump and configured to spray at least one end of the motor rotor.

In another illustrative embodiment a vehicle includes a vehicle body, an electrical motor system, and at least one wheel. The electrical motor system includes an oil reservoir, a motor stator, and an oil pump. The oil reservoir is configured to hold oil therein. The motor stator is positioned such that at least a portion thereof is positioned within the oil reservoir where the at least the portion of the motor stator is in thermal communication with the oil while the oil reservoir includes the oil therein. The motor stator is configured to warm the oil while in an oil warming mode. The oil pump is fluidly coupled to the oil reservoir and is configured to draw oil out of the oil reservoir. The at least one wheel is coupled to the vehicle body and configured to be driven by at least one motor having a motor stator and a motor rotor coupled to a drivetrain for the at least one wheel, the motor rotor being configured to rotate relative to the motor stator.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

The present disclosure is illustrated and described herein with reference to the various drawings, in which like reference numbers are used to denote like system components/method steps, as appropriate, and in which.

DETAILED DESCRIPTION

Figure 1:
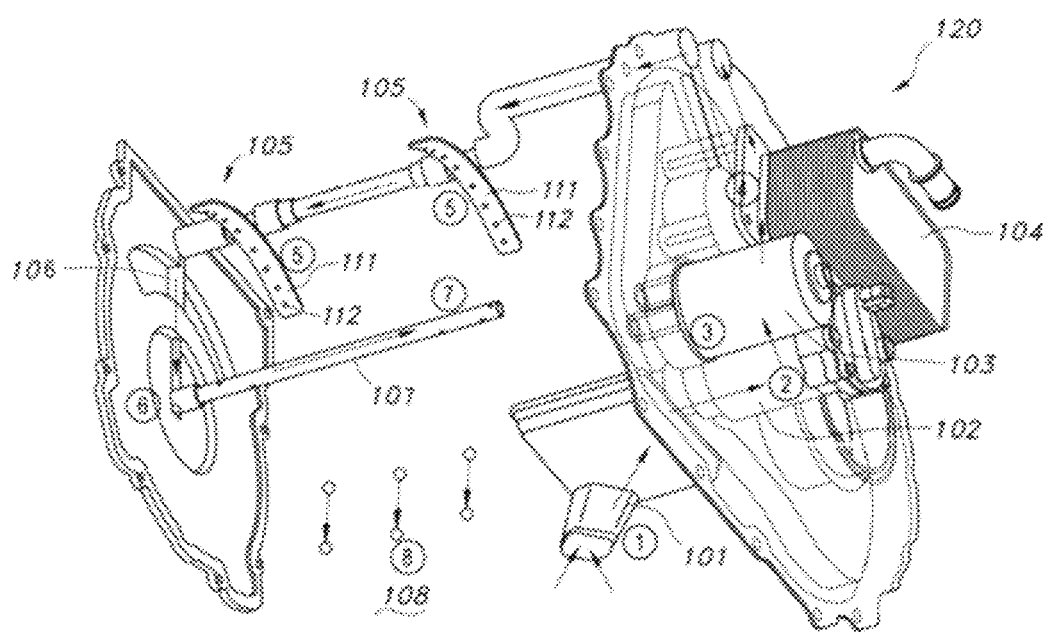
FIG. 1 is an exploded view in partial schematic form of an illustrative oil circulation system for an electric motor.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here.

Various disclosed embodiments include illustrative oil warming systems, electric motors, and vehicles.

By way of overview, in various embodiments a system includes an oil reservoir adapted to submerge a portion of a motor stator in oil stored therein. The oil in the oil reservoir is placeable in thermal communication with the motor stator and the motor stator is configured to warm the oil in an oil warming mode. In various embodiments, in the oil warming mode, the motor stator receives power from a motor drive, such as an inverter, that, while causing heat generation in the windings of the motor stator, does not induce torque generation in the motor rotor, such as power at a fixed magnitude along the d-axis. In other embodiments, a current is induced (fixed magnitude or otherwise) while holding the motor rotor stationary, such as by using a mechanical brake or a vehicle braking system. An oil pump is coupled to the oil reservoir and configured to draw oil out of the oil reservoir. At least one oil sprayer may be coupled to the oil pump and configured to spray at least one end of the motor rotor.

Still by way of overview, various embodiments use an electric motor, such as without limitation an electric motor of an electric vehicle, as an active heat source to heat up the oil by using a portion of the stator winding that is submerged under oil. For example, in various embodiments oil may be sprayed directly onto exposed end-windings. It will be appreciated that heating up the oil may help contribute to increasing oil flow capacity and reducing electric pump power consumption. Thus, in various embodiments using the heated motor stator can help contribute to reducing load on the pump. Various embodiments can also help contribute to providing a high flow rate of low viscosity oil to circulate during cold starts and low temperature vehicle operation, thereby helping protect gears and bearings and helping contribute to improving durability and life of a drive unit of an electric vehicle.

Figure 2:
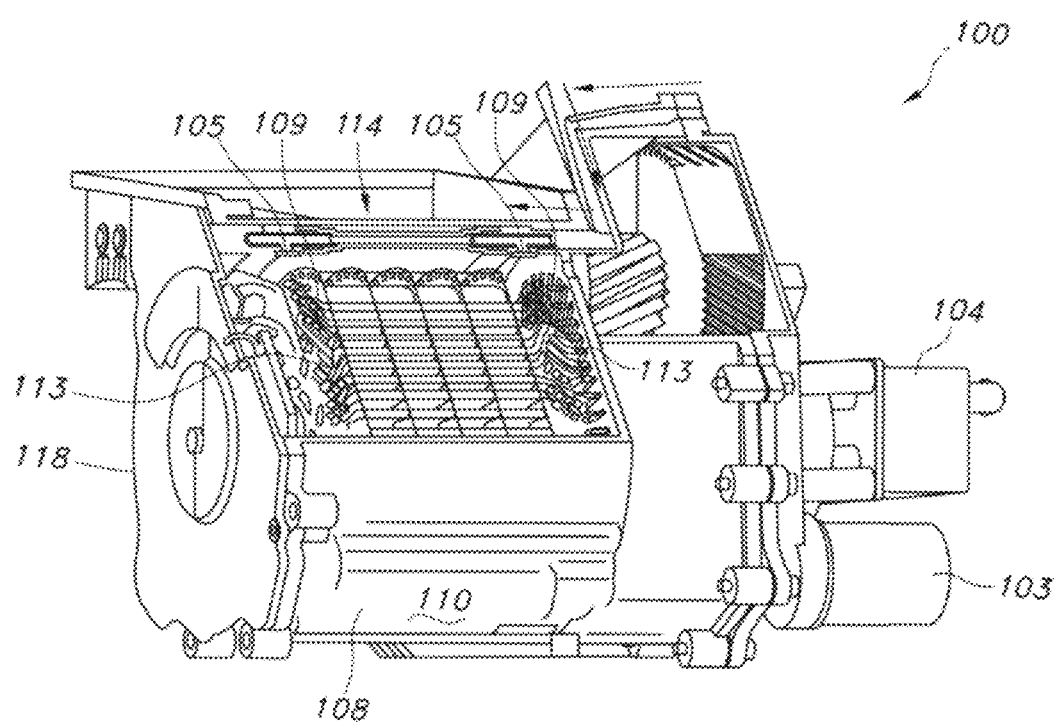
FIG. 2 is a perspective view of an electric motor system including the oil circulation system in a stator warming configuration and oil lube path through oil spray bar of FIG. 1.
Figure 3:
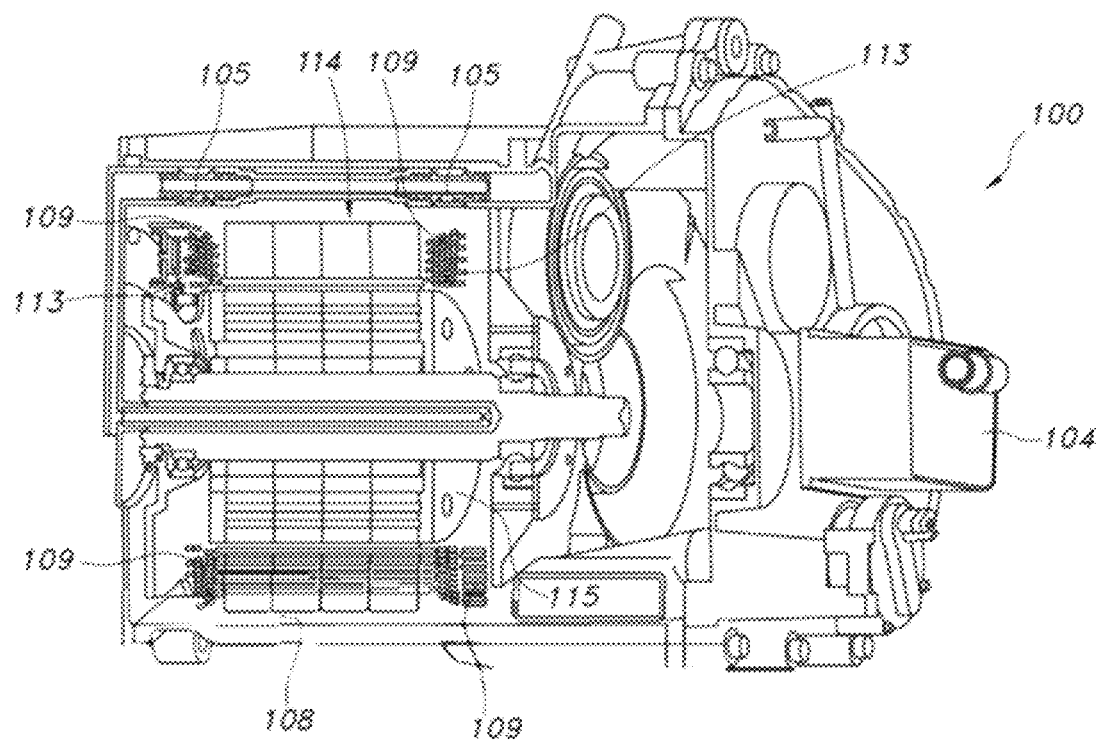
FIG. 3 is a perspective view in partial cut-away view of the electric motor system and the motor stator in the oil warming configuration interfacing with oil in a sump of FIG. 2.

Referring now to FIGS. 1-3, in various embodiments an illustrative system 120 is provided for warming and distributing oil in an electrical motor system 100. In various disclosed embodiments, a non-limiting example given by way of illustration only of the electrical motor system 100 is that of an electric motor for an electric vehicle. It will be appreciated that the example of the electrical motor system 100 as an electric motor for an electric vehicle is given by way of illustration only and not of limitation. It will also be appreciated that no such limitation of the electrical motor system 100 as an electric motor for an electric vehicle is intended and is not to be inferred. To that end, the electric motor system 100 may be any type of electric motor as desired for a particular application.

Accordingly, it will be appreciated that the electrical motor system 100 may be any type of electrical motor as desired for a particular application. For example, in some embodiments the electrical motor system 100 may be an alternating current (AC) motor and in some other embodiments the electrical motor system 100 may be a direct current (DC) electrical motor. In embodiments in which the motor 100 is an AC motor, the electrical motor system 100 may be any type of AC motor as desired for a particular application, such as without limitation induction motors (also known as asynchronous motors) either single phase or polyphase and synchronous motors either reluctance or hysteresis. In embodiments in which the electrical motor system 100 is a DC motor, the electrical motor system 100 may be any type of DC motor as desired for a particular application, such as without limitation permanent magnet DC motors, series DC motors, shunt DC motors, and compound DC motors. In the interest of brevity, non-limiting, illustrative examples of an AC motor for the electrical motor system 100 are provided herein for purposes of illustration only and not of limitation. However, it is again emphasized that the electrical motor system 100 is not limited to an AC motor (of any type) and, in some embodiments, may be a DC motor.

In various embodiments the electrical motor system 100 includes the oil warming system 120 and a motor 114, the motor including a motor stator 109 and a motor rotor 115. The oil warming system 120 (also referred to as an oil delivery system in some embodiments) includes an oil reservoir 108. Various embodiments of the oil reservoir 108 are contemplated, including an oil reservoir 108 that includes a separate oil sump, an oil reservoir 108 that is formed in another structure of the vehicle or the electrical motor system 100, such as an engine casing, a casing of the electrical motor system 100, and the like.

In various embodiments, the oil reservoir 108 is configured to receive at least a portion of the motor stator 109 therein such that the motor stator 109, such as the portion received in the oil reservoir 108, is in thermal communication with oil held in the oil reservoir (while the oil is therein). In some of these embodiments, the oil reservoir 108 is configured to submerge a portion of a motor stator 109 in the oil.

An oil circuit is adapted to provide the oil from the oil reservoir 108 to various systems for lubrication and cooling thereof. The oil in the oil reservoir 108 may be in thermal communication with the motor stator 109. The motor stator 109 may be configured to warm the oil in an oil warming mode, for example, when temperatures are low and oil viscosity is high, by providing electrical power to the stator 109. By providing electrical power to the stator 109, current resistance within the stator causes a rise in temperature in the stator 109. Because stator 109 is in thermal contact with the oil in oil reservoir 108, it is heated and the viscosity is decreased.

In various embodiments, the oil circuit includes the oil reservoir 108, an inlet in the oil reservoir 108, such as a suction filter 101, an oil pump 102, an oil filter 103, a heat exchanger 104, oil spray bars 105, and an oil tube 107. In various embodiments, the oil pump 102 is fluidly coupled to the oil reservoir 108 and adapted to draw oil out of the oil reservoir 108 through the suction filter 101. The oil pump 102 may be any type of suitable oil pump as desired for a particular application. Oil pumps are well known to those of skill in the art and, as a result, explanation of construction and operation is not necessary for an understanding of disclosed embodiments by one of skill in the art. After being drawn from the oil reservoir 108 through the suction filter 101 by the oil pump 102, the oil is pumped through the filter 103 and through the heat exchanger 104 (or through a heat exchanger bypass) before being delivered to the motor stator 109. In various embodiments, at least one oil sprayer 105 is fluidly coupled to the oil pump 102 downstream of the oil filter 103 and the heat exchanger 104 and is configured to spray at least one component of the motor stator 109, such as an end winding 113 of the motor stator 109. In various embodiments, the oil tube is also downstream of the oil filter 103 and the heat exchanger 104 and is configured to deliver oil to an interior of the motor stator 109. In the embodiment illustrated in FIGS. 1-3, the oil tube 107 is downstream of the at least one oil sprayer 105 and receives the oil via a cover tube 106 positioned within a cover of the electrical motor system 120.

In various embodiments, the oil reservoir 108 includes an oil sump 110. In various embodiments, the oil filter 103 is coupled between the oil pump 102 and the oil sprayer(s) 105 and is configured to filter oil moving from the oil pump 102 and to the oil sprayer(s) 105. The oil filter 103 may be any type of suitable oil filter as desired for a particular application. Oil filters are well known to those of skill in the art and, as a result, explanation of construction and operation is not necessary for an understanding of disclosed embodiments by one of skill in the art.

In various embodiments, the oil sprayer(s) 105 include at least two sprayer bars 111 having multiple outlet holes 112. It will be appreciated that any number of the oil sprayers 105 may be used as desired for a particular application. In some embodiments, more than one of the oil sprayers 105 may be used. In some other embodiments, only one oil sprayer 105 is used. It will also be appreciated that any number of the sprayer bars 111 may be used as desired for a particular application. In some embodiments, if desired at least two of the sprayer bars 111 are used. In some other embodiments, only one sprayer bar 111 is used.

In various embodiments, the heat exchanger 104 is fluidly coupled between the oil pump 102 and the oil sprayer(s) 105. As will be discussed in greater detail below, in various embodiments, a bypass valve 130 (FIGS. 6 and 7) is coupled in parallel with the heat exchanger 104 and is adapted to permit oil to bypass the heat exchanger 104. In various embodiments, the heat exchanger 104 is adapted to receive heated oil from the oil pump 102 and reject heat from the oil before supplying the oil back to the oil sprayer(s) 105. The heat exchanger 104 may be any type of heat exchanger as desired for a particular application, such as without limitation a tube-and-shell heat exchanger, a cross-flow heat exchanger, a counter-flow heat exchanger, a plate heat exchanger, and the like. Heat exchangers are well known to those of skill in the art and, as a result, explanation of construction and operation is not necessary for an understanding of disclosed embodiments by one of skill in the art.

The oil sprayer(s) 105 is adapted to spray oil onto exposed end windings 113 of the motor stator 109. In some embodiments the oil sprayer(s) 105 adapted to spray oil onto exposed ends of the motor rotor 115 and the exposed end windings 113 of the motor stator 109.

In various embodiments, the oil tube 107 is adapted to provide oil to the motor rotor 115 for the cooling and lubrication thereof. In some of these embodiments, a cover tube 106 is adapted to supply the oil to the oil tube 107. After the oil is supplied to the motor stator 109 and the motor rotor 115 and used for lubrication and/or cooling, the oil is returned to the oil reservoir 108.

In various embodiments, the oil reservoir 108 is adapted to submerge a portion of the motor stator 109 in oil stored therein. The motor stator 109 may be electrically couplable to receive electrical power in an oil warming mode. The oil pump 102 may be coupled to the oil reservoir 108 and may be configured to draw oil out of the oil reservoir 108. The oil sprayer(s) 105 may be coupled to the oil pump 102 and configured to spray at least one end of the motor stator 109.

Figure 4:
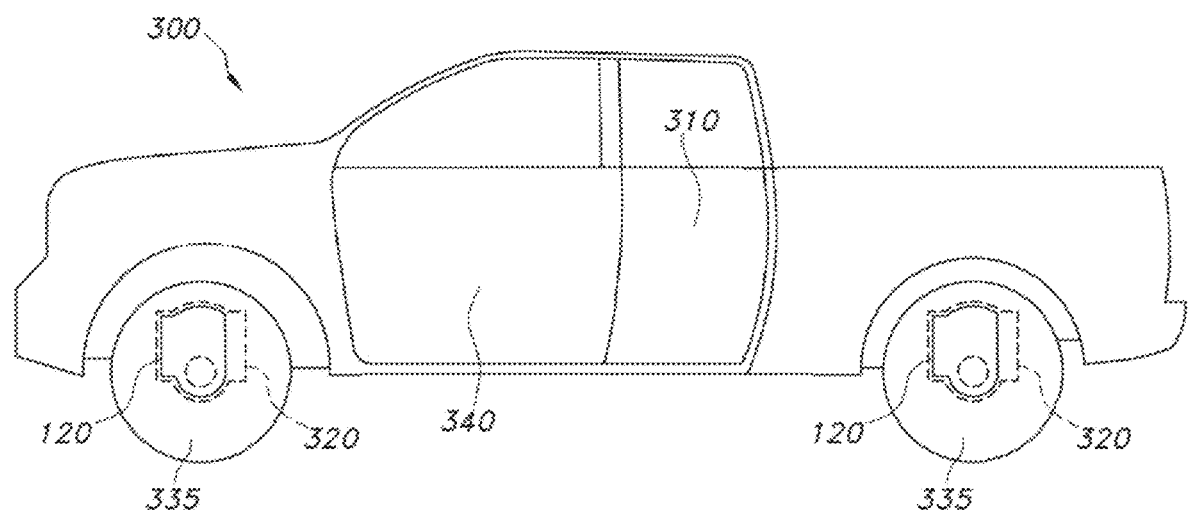
FIG. 4 is a schematic diagram of an illustrative vehicle including the electric motor system of FIG. 2.

The electric motor 100 also includes the motor rotor 115. The motor rotor 115 is adapted to rotate relative to the motor stator 109. Referring now to FIG. 4, in various embodiments a vehicle 300 includes a vehicle body 310 and at least one wheel 335 coupled to the vehicle body 310 that is adapted to be driven by at least one motor 100 of the present disclosure, including the motor stator 109 and the motor rotor 115 that is coupled to a drivetrain for the at least one wheel 335. For example, as depicted in FIGS. 1-3, the motor rotor 115 is configured to rotate relative to the motor stator 109, the oil reservoir 108 is adapted to submerge a portion of the motor stator 109 in oil, and the motor stator 109 is electrically couplable to receive power from a motor drive, such as AC power from an inverter, in an oil warming mode. The oil pump 102 is fluidly coupled to the oil reservoir 108 and is adapted to draw oil out of the oil reservoir 108. The oil sprayer(s) 105 is fluidly coupled to the oil pump 102 and is adapted to spray one or more components of the motor stator 109, such as at least one end winding 113 thereof.

While the present disclosure refers to oil, an oil pump, an oil filter, an oil spray bar, and an oil tube, it will be appreciated that any suitable fluid for lubricating and cooling the motor 100 can be used, such as synthetic oil, and the like.

Figure 5:
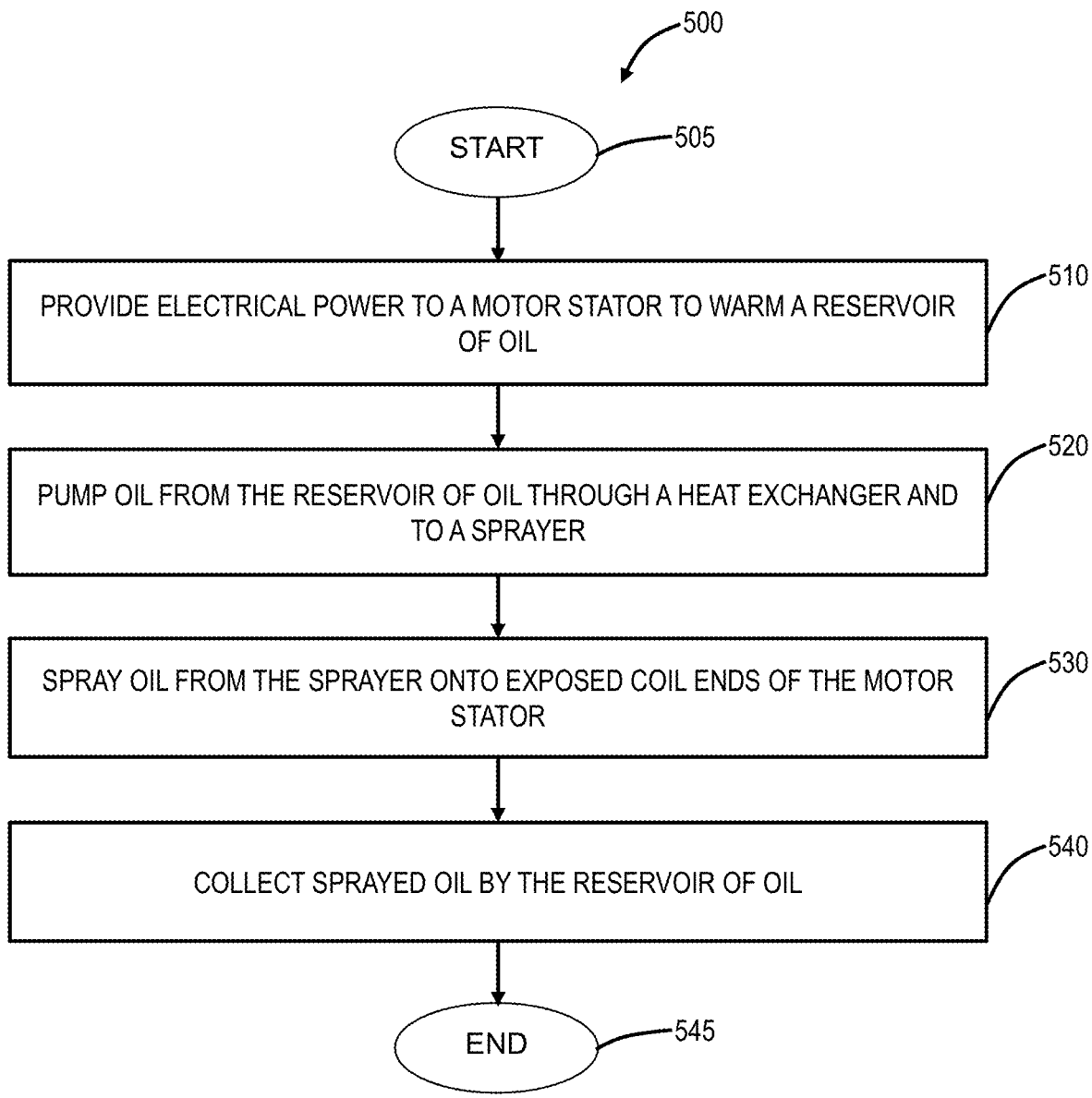
FIG. 5 is a flow chart of an illustrative method of warming oil for an oil spraying system for an electric motor system.

Referring now to FIG. 5, a method 500 of warming oil for an electric motor begins at a Start block 505. At a block 510, electrical power is provided to a motor stator to warm a reservoir of oil. In various embodiments, block 510 includes providing the electrical power from a motor drive, such as an inverter, where the electric power has a fixed magnitude and is configured to inject current on the d-axis to ensure zero torque generation. In various embodiments, the current magnitude is selected such that the windings heat up in a short period of time, but without exceeding thermal limitations of the windings. In other embodiments, a current is induced (fixed magnitude or otherwise) while holding the motor rotor 115 stationary. In some of these embodiments, the motor rotor 115 is held stationary via one of a mechanical brake, a vehicle braking system, a combination thereof, and the like.

In various embodiments, block 510 is performed in response to a temperature of the oil being below a predetermined temperature, such as below 0° Celsius, or while the temperature of the oil is within a predetermined range, such as from −30° Celsius to 0° Celsius. At a block 520, oil is pumped from the reservoir of oil through a heat exchanger and to a sprayer. In various embodiments, the oil pump 102 is configured to (such as via a controller) change the flow rate of the oil begin supplied by the oil pump 102 once the oil reaches a predetermined temperature. In other embodiments, as will be detailed below in further detail, the heat exchanger is at least partially bypassed until the oil reaches a predetermined temperature. At a block 530, oil may be sprayed from the sprayer onto exposed coil ends of the motor stator. At a block 540, oil may be collected by the reservoir of oil. The method 500 ends at an End block 545.

By using the motor stator 109 to heat the oil, the viscosity of the oil can be reduced, which reduces the impedance during distribution of the oil and allows the oil pump 102 to operate with a lower power consumption while still ensuring the proper lubrication and cooling of the components of the electrical motor system 100.

However, while the oil (or similar fluid) is at low temperatures, such as between −30° Celsius and 30° Celsius, the high oil viscosity results in an increased system impedance and limits the amount of flow and pressure capacity that is available due to the finite power, flow, and pressure capability of the oil pump 102. As such, in various embodiments, the electric motor system 100 is configured bypass at least some of the flow through the heat exchanger 104 based on a temperature of the oil. This allows the oil pump 102 to operate at lower temperatures and can reduce overloading of the oil pump 102 as well as increase the operating life of the oil pump 102.

Figure 6:
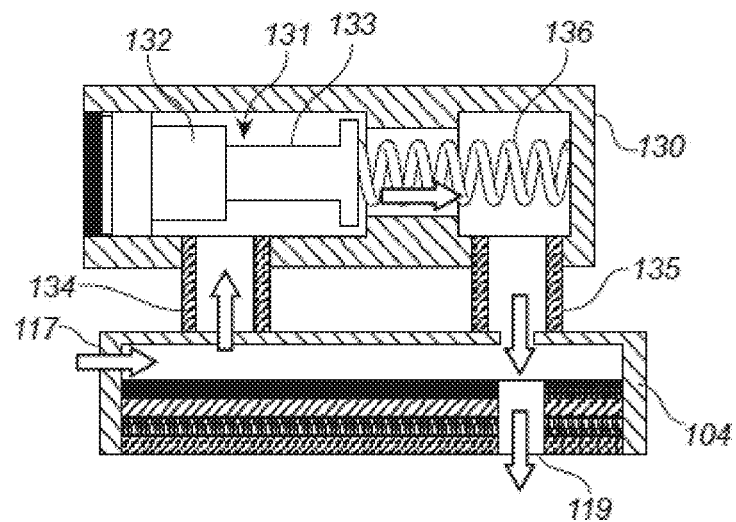
FIG. 6 is a schematic diagram of an illustrative heat exchanger of the electrical motor system with a bypass valve for the heat exchanger in an open state.
Figure 7:
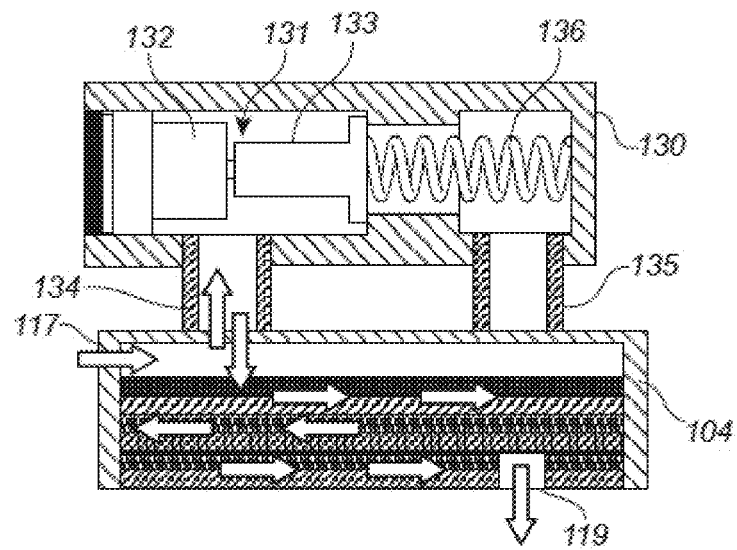
FIG. 7 is a schematic diagram of an illustrative heat exchanger of the electrical motor system with a bypass valve for the heat exchanger in a closed state.

Referring to FIGS. 6 and 7, in various embodiments, the electric motor system 100 includes a bypass valve 130 that is adapted to control an amount of oil that bypasses the heat exchanger 104 based on a temperature of the oil. In some embodiments, such as the embodiment illustrated in FIGS. 6 and 7, the bypass valve 130 includes a valve 131 that is passive. In various embodiments, the valve 131 includes a stopper 133 and a core 132 causes the stopper 133 to move as the core 132 heats up. In embodiments, the core 132 includes a material that expands upon heating, such as wax. In various embodiments, the stopper 133 is pushed open via a spring 136, which pushes the stopper 133 into an open position. In other embodiments, the valve 131 condition is controlled via a controller (such as controller 200 discussed below). In some of these embodiments, the valve 131 is controlled via an electric or pneumatic actuator that is controlled based on the temperature of the oil.

In various embodiments, the bypass valve 130 includes a bypass inlet 134 fluidly coupled to a heat exchanger inlet 117 and a bypass outlet 135 fluidly coupled to a heat exchanger outlet 119. In other embodiments, the bypass inlet 134 is fluidly coupled to a supply line upstream of the heat exchanger inlet 117 and the bypass outlet 135 is fluidly coupled to a supply line downstream of the heat exchanger outlet 119.

In various embodiments, the electric motor system 100 is configured to operate in a low-temperature mode while the oil temperature is below a first predetermined temperature, a high-temperature mode while the oil temperature is above a second predetermined temperature, and an intermediate-temperature mode while the oil temperature is between the first predetermined temperature and the second predetermined temperature. In the low-temperature mode, the bypass valve 130 is open and the oil bypasses the heat exchanger 104. In some embodiments, in the low-temperature mode, the bypass valve 130 is fully open and the oil fully bypasses the heat exchanger 104. In the high-temperature mode, the bypass valve 130 is closed and the oil is directed through the heat exchanger 104. In some embodiments, the bypass valve is fully closed and the oil is fully directed through the heat exchanger 104. In the intermediate-temperature mode, the bypass valve 130 is partially open. In embodiments, an amount of oil directed through the heat exchanger 104 increases as the temperature of the oil increases until the bypass valve 130 is fully closed at the second predetermined temperature. In embodiments, an amount of oil bypassing the heat exchanger while operating in the intermediate-temperature mode is less than an amount bypassed while operating in the low-temperature mode and greater than an amount bypassed while operating in the high-temperature mode.

In various embodiments, the rating of the oil pump 102, such as for power, flow, and pressure capabilities is based off of the system impedance with the oil at the first predetermined temperature and the bypass valve 130 is fully open. As such, in these embodiments, a lower power oil pump can be used to supply the oil throughout the electric motor system 100, which can conserve energy and reduce any parasitic drain the oil pump 102 causes in a vehicle.

In various embodiments, the oil is preheated using the motor stator 109, as discussed above, and the oil pump 102 increases a flowrate thereof once the oil reaches a third predetermined temperature. In some embodiments, the third predetermined temperature is less than the first predetermined temperature. In other embodiments, the third predetermined temperature is equal to the first predetermined temperature.

In various embodiments, the first predetermined temperature is less than 0° Celsius and the second predetermined temperature is greater than 0° Celsius. In other embodiments, the first predetermined temperature is between −35° Celsius and −25° Celsius, such as at −30° Celsius, and the second predetermined temperature is between 25° Celsius and 35° Celsius, such as at 30° Celsius. However, other temperatures for the first predetermined temperature and the second predetermined temperature are also contemplated.

In various embodiments, the percentage that the bypass valve 130 is open for controlling the amount of oil flowing through the heat exchanger 104 in the intermediate-temperature mode is defined by a temperature-opening curve. In various embodiments, the temperature-opening curve, including the first predetermined temperature and the second predetermined temperature, is based on at least one of a rating of the oil pump 102 (power, flow, and pressure capabilities), viscosity of the oil at the various temperatures, and impedance of the oil delivery system (with or without flow through the heat exchanger 104).

Figure 8:
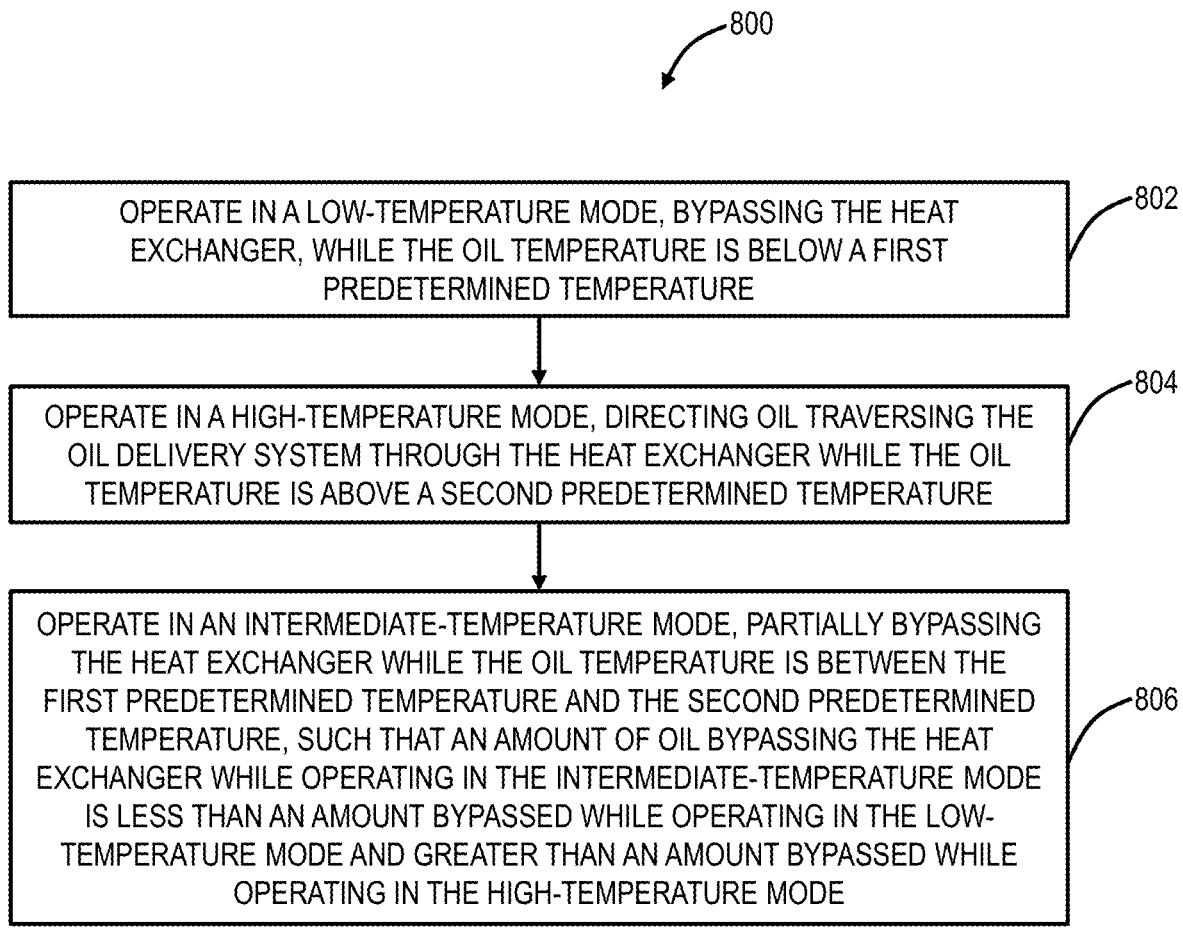
FIG. 8 is a flow chart of an illustrative method of bypassing a heat exchanger in an electric motor system.

Referring to FIG. 8, the method 800 of bypassing a heat exchanger in an oil delivery system of an electric motor system includes operating in a low-temperature mode, bypassing the heat exchanger, while the oil temperature is below a first predetermined temperature at step 802. The method also includes operating in a high-temperature mode, directing oil traversing the oil delivery system through the heat exchanger while the oil temperature is above a second predetermined temperature at step 804. The method further includes operating in an intermediate-temperature mode, partially bypassing the heat exchanger while the oil temperature is between the first predetermined temperature and the second predetermined temperature, such that an amount of oil bypassing the heat exchanger while operating in the intermediate-temperature mode is less than an amount bypassed while operating in the low-temperature mode and greater than an amount bypassed while operating in the high-temperature mode at step 806.

Figure 9:
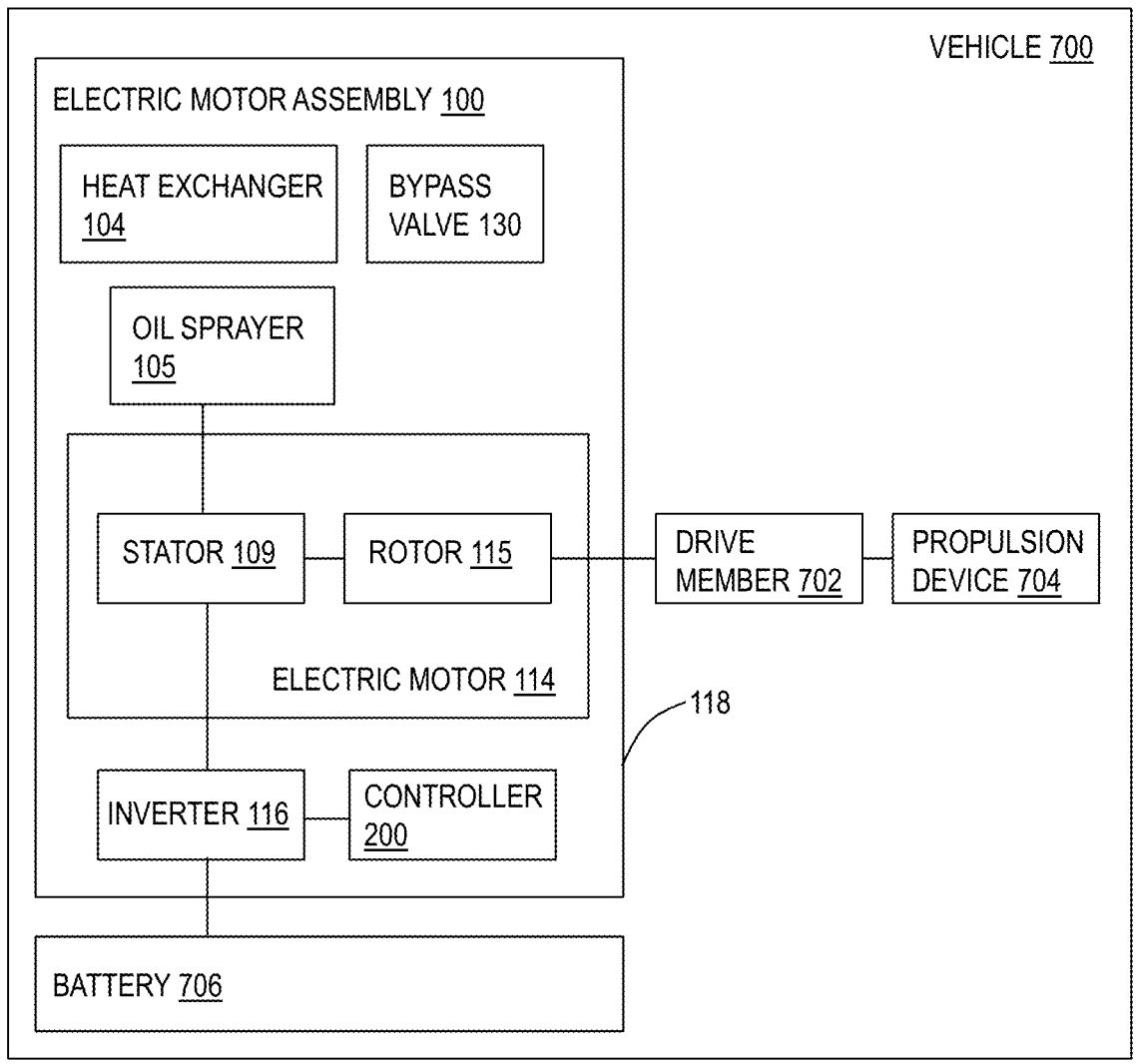
FIG. 9 is a block diagram of an illustrative vehicle.

Referring to FIG. 9, in various embodiments an illustrative vehicle 700 includes at least one drive member 702, at least one propulsion device 704, at least one motor assembly 100, and at least one battery 706. The at least one propulsion device 704 is coupled to the at least one drive member 702. The at least one electric motor assembly 100 includes a housing 118. The electric motor 114 is disposed in the housing 118 (FIG. 2). The electric motor 114 includes the motor stator 109 having exposed end windings and a rotor 115 configured to rotate relative to the motor stator 109. The motor rotor 115 is coupled to the at least one drive member 702. An oil sprayer 105 is configured spray fluid onto the exposed end windings 113 of the motor stator 109. Details of the electric motor assembly 100, the electric motor 114, the motor rotor 115, the motor stator 109, and the oil sprayer 105 have been described above and, for sake of brevity, details of their construction and operation are not repeated (and need not be repeated for an understanding by a person of skill in the art).

In various embodiments, the electric motor assembly 100 further includes a motor drive 116 electrically coupled to the motor stator 109 and to a battery 706 of the vehicle 700. In various embodiments, the motor drive 116 is an inverter. The motor drive 116 is configured to deliver power from the battery 706 to the motor stator 109. In a drive mode, the motor stator 109 delivers power to induce torque in the motor rotor 115. In various embodiments, in the warming mode, the motor drive 116 is configured to deliver power without torque generation, such as by delivering power with a fixed magnitude along the d-axis (d-axis current injection). In various embodiments, the electric motor assembly 100 includes a controller 200 that is configured to control the motor drive 116 and the power delivered therefrom.

It will be appreciated that the vehicle 700 can be any type of vehicle whatsoever as desired without limitation. Given by way of non-limiting example, in various embodiments the vehicle 700 may be an electric vehicle (that is, an all-electrically driven vehicle) or a hybrid vehicle. For example, and given by way of non-limiting examples, in various embodiments the vehicle 700 may include a motor vehicle driven by wheels and/or tracks, such as, without limitation, an automobile, a truck, a sport utility vehicle (SUV), a van, an all-terrain vehicle (ATV), a motorcycle, an electric bicycle, a tractor, a lawn mower such as without limitation a riding lawn mower, a snowmobile, and the like. Given by way of further non-limiting examples, in various embodiments the vehicle 700 may include a marine vessel such as, without limitation, a boat, a ship, a submarine, a submersible, an autonomous underwater vehicle (AUV), and the like. Given by way of further non-limiting examples, in various embodiments the vehicle 700 may include an aircraft such as, without limitation, a fixed wing aircraft, a rotary wing aircraft, and a lighter-than-air (LTA) craft.

In various embodiments the electric motor (or motors) 114 are configured to drive the vehicle 700. That is, in various embodiments the electric motor (or motors) 114 may drive any drive member 702 that drives any propulsion device 704, such as without limitation a wheel or wheels, a track or tracks, a propellor or propellors, a propulsor or propulsors, a rotor or rotors, or the like, associated with the vehicle 700.

For example, in some embodiments in a motor vehicle one electric motor 114 may be configured to drive one drive member 702 such as an axle or a chain ring that drives one wheel or track, in some other embodiments in a motor vehicle one electric motor 114 may be configured to drive an axle that rotates two wheels or two tracks, and in some other embodiments in a motor vehicle one electric motor 114 may be configured to drive an axle that rotates one wheel or one track and another motor configured to drive another axle that rotates another wheel or another track.

Similarly, in some embodiments in a marine vessel one electric motor 102 may be configured to drive one propeller or propulsor, in some other embodiments in a marine vessel one electric motor 114 may be configured to drive a shaft that rotates two propellers or two propulsors, and in some other embodiments in a marine vessel one electric motor 114 may be configured to drive a shaft that rotates one propeller or propulsor and another electric motor 114 may be configured to drive another shaft that rotates another propeller or propulsor.

Likewise, in some embodiments in an aircraft one electric motor 114 may be configured to drive one propeller or rotor, in some other embodiments in an aircraft one electric motor 114 may be configured to drive a shaft that rotates two propellers or two rotors, and in some other embodiments in an aircraft one electric motor 114 may be configured to drive a shaft that rotates one propeller or rotor and another electric motor 114 may be configured to drive another shaft that rotates another propeller or rotor.

Figure 10:
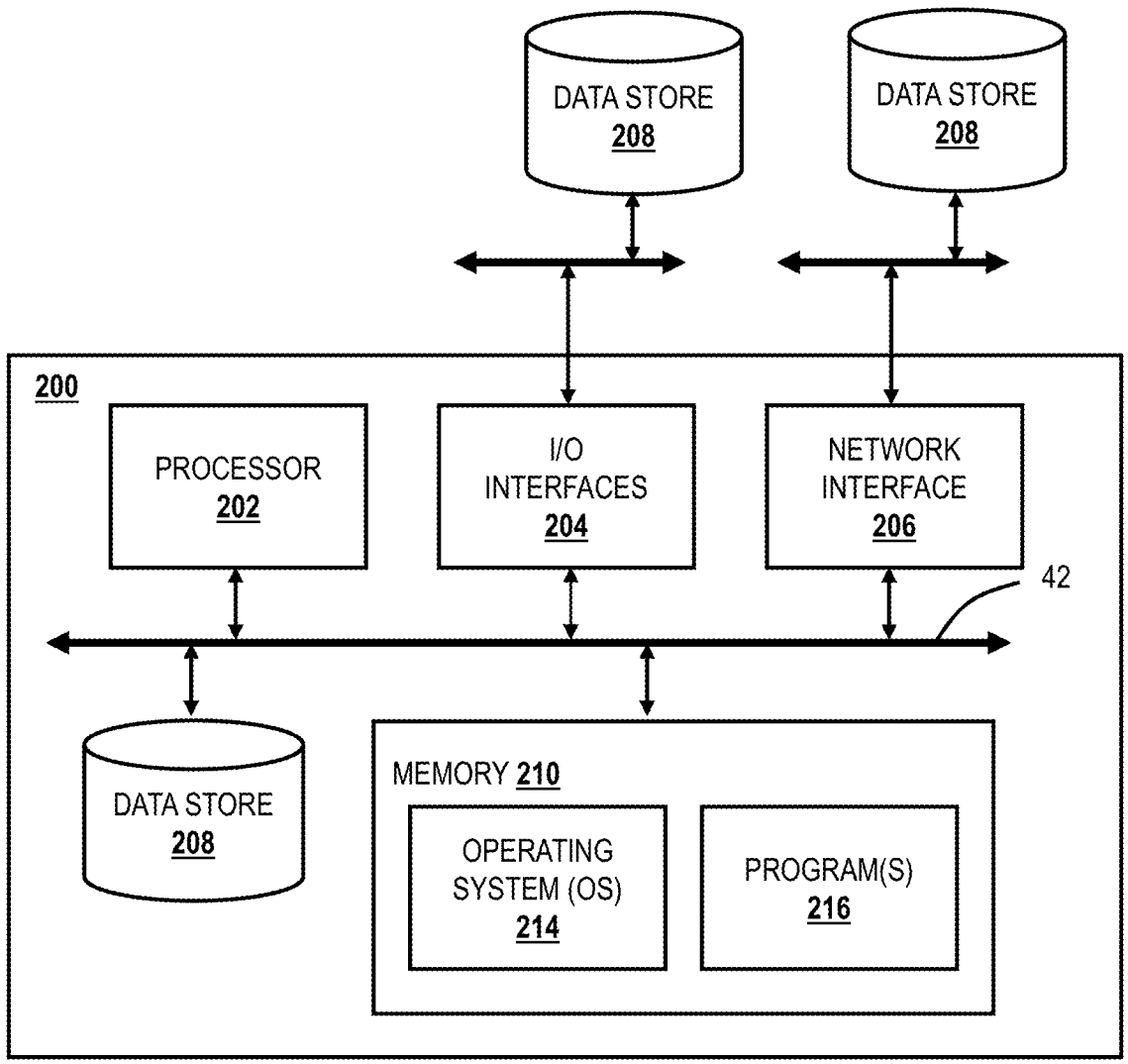
FIG. 10 is a block diagram illustrating an embodiment of the controller of the electric motor assembly 100 of FIG. 9.

Referring to FIG. 10, the controller 200 may be a digital computer that, in terms of hardware architecture, generally includes a processor 202, input/output (I/O) interfaces 204, a network interface 206, a data store 208, and memory 210. It should be appreciated by those of ordinary skill in the art that FIG. 8 depicts the controller 200 in an oversimplified manner, and a practical embodiment may include additional components and suitably configured processing logic to support known or conventional operating features that are not described in detail herein. The components (202, 204, 206, 208, and 210) are communicatively coupled via a local interface 212. The local interface 212 may be, for example, but not limited to, one or more buses or other wired or wireless connections, as is known in the art. The local interface 212 may have additional elements, which are omitted for simplicity, such as controllers, buffers (caches), drivers, repeaters, and receivers, among many others, to enable communications. Further, the local interface 212 may include address, control, and/or data connections to enable appropriate communications among the aforementioned components.

The processor 202 is a hardware device for executing software instructions. The processor 202 may be any custom made or commercially available processor, a central processing unit (CPU), an auxiliary processor among several processors associated with the controller 200, a semiconductor-based microprocessor (in the form of a microchip or chipset), or generally any device for executing software instructions. When the controller 200 is in operation, the processor 202 is configured to execute software stored within the memory 210, to communicate data to and from the memory 210, and to generally control operations of the controller 200 pursuant to the software instructions. The I/O interfaces 214 may be used to receive input from and/or for providing system output to one or more devices or components. I/O interfaces 34 may include, for example, a serial port, a parallel port, a small computer system interface (SCSI), a serial ATA (SATA), a fiber channel, Infiniband, iSCSI, a PCI Express interface (PCI-x), an infrared (IR) interface, a radio frequency (RF) interface, and/or a universal serial bus (USB) interface.

The network interface 36 may be used to enable the controller 200 to communicate on a network, such as a network associated with the vehicle, to communicate with other devices and components of the vehicle, and the like. A data store 208 may be used to store data. The data store 208 may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 208 may incorporate electronic, magnetic, optical, and/or other types of storage media. In one example, the data store 208 may be located internal to the controller 200, such as, for example, an internal hard drive connected to the local interface 212 in the controller 200. Additionally, in another embodiment, the data store 208 may be located external to the controller 200.

The memory 210 may include any of volatile memory elements (e.g., random access memory (RAM, such as DRAM, SRAM, SDRAM, etc.)), nonvolatile memory elements (e.g., ROM, hard drive, tape, CDROM, etc.), and combinations thereof. Moreover, the memory 210 may incorporate electronic, magnetic, optical, and/or other types of storage media. Note that the memory 210 may have a distributed architecture, where various components are situated remotely from one another, but can be accessed by the processor 202. The software in memory 210 may include one or more software programs, each of which includes an ordered listing of executable instructions for implementing logical functions. The software in the memory 210 includes a suitable operating system (O/S) 214 and one or more programs 216. The operating system 214 essentially controls the execution of other computer programs, such as the one or more programs 216, and provides scheduling, input-output control, file and data management, memory management, and communication control and related services. The one or more programs 216 may be configured to implement the various processes, algorithms, methods, techniques, etc. described herein.

It will be appreciated that some embodiments described herein may include or utilize one or more generic or specialized processors ("one or more processors") such as microprocessors; Central Processing Units (CPUs); Digital Signal Processors (DSPs): customized processors such as Network Processors (NPs) or Network Processing Units (NPUs), Graphics Processing Units (GPUs), or the like; Field-Programmable Gate Arrays (FPGAs); and the like along with unique stored program instructions (including both software and firmware) for control thereof to implement, in conjunction with certain non-processor circuits, some, most, or all of the functions of the methods and/or systems described herein. Alternatively, some or all functions may be implemented by a state machine that has no stored program instructions, or in one or more Application-Specific Integrated Circuits (ASICs), in which each function or some combinations of certain of the functions are implemented as custom logic or circuitry. Of course, a combination of the aforementioned approaches may be used. For some of the embodiments described herein, a corresponding device in hardware and optionally with software, firmware, and a combination thereof can be referred to as "circuitry configured to," "logic configured to," etc. perform a set of operations, steps, methods, processes, algorithms, functions, techniques, etc. on digital and/or analog signals as described herein for the various embodiments.

Moreover, some embodiments may include a non-transitory computer-readable medium having instructions stored thereon for programming a computer, server, appliance, device, processor, circuit, etc. to perform functions as described and claimed herein. Examples of such non-transitory computer-readable medium include, but are not limited to, a hard disk, an optical storage device, a magnetic storage device, a Read-Only Memory (ROM), a Programmable ROM (PROM), an Erasable PROM (EPROM), an Electrically EPROM (EEPROM), Flash memory, and the like. When stored in the non-transitory computer-readable medium, software can include instructions executable by a processor or device (e.g., any type of programmable circuitry or logic) that, in response to such execution, cause a processor or the device to perform a set of operations, steps, methods, processes, algorithms, functions, techniques, etc. as described herein for the various embodiments.

In some instances, one or more components may be referred to herein as "configured to," "configured by," "configurable to," "operable/operative to," "adapted/adaptable," "able to," "conformable/conformed to," etc. Those skilled in the art will recognize that such terms (for example "configured to") generally encompass active-state components and/or inactive-state components and/or standby-state components, unless context requires otherwise.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein. It will be understood by those within the art that, in general, terms used herein, and especially in the appended claims (for example, bodies of the appended claims) are generally intended as "open" terms (for example, the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to claims containing only one such recitation, even when the same claim includes the introductory phrases "one or more" or "at least one" and indefinite articles such as "a" or "an" (for example, "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (for example, the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (for example, "a system having at least one of A, B, and C" would include but not be limited to systems that have A alone, B alone, C alone, A and B together, A and C together, B and C together, and/or A, B, and C together, etc.). It will be further understood by those within the art that typically a disjunctive word and/or phrase presenting two or more alternative terms, whether in the description, claims, or drawings, should be understood to contemplate the possibilities of including one of the terms, either of the terms, or both terms unless context dictates otherwise. For example, the phrase "A or B" will be typically understood to include the possibilities of "A" or "B" or "A and B."

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware.

With respect to the appended claims, those skilled in the art will appreciate that recited operations therein may generally be performed in any order. Also, although various operational flows are presented in a sequence(s), it should be understood that the various operations may be performed in other orders than those which are illustrated or may be performed concurrently. Examples of such alternate orderings may include overlapping, interleaved, interrupted, reordered, incremental, preparatory, supplemental, simultaneous, reverse, or other variant orderings, unless context dictates otherwise. Furthermore, terms like "responsive to," "related to," or other past-tense adjectives are generally not intended to exclude such variants, unless context dictates otherwise.

While the disclosed subject matter has been described in terms of illustrative embodiments, it will be understood by those skilled in the art that various modifications can be made thereto without departing from the scope of the claimed subject matter as set forth in the claims.

What is claimed is:

1. An electric motor comprising:
   a motor stator;
   a motor rotor configured to rotate relative to the motor stator;
   an oil reservoir configured to hold oil therein such that a portion of the motor stator is in thermal communication with the oil while the oil reservoir include the oil therein, the motor stator being electrically couplable to receive electrical power and increase, based on the electrical power, a temperature of the oil;

an oil pump fluidly coupled to the oil reservoir and configured to draw oil out of the oil reservoir, wherein the oil pump is configured to increase a flowrate of the oil once a temperature of the oil reaches a predetermined temperature while the motor stator is operating in an oil warming mode of the oil;

an oil sprayer fluidly coupled to the oil pump and configured to spray the oil onto exposed end windings of the motor stator, the sprayed oil being collected in the oil reservoir;

an oil tube fluidly coupled to the oil pump downstream of the oil sprayer and configured to deliver the oil to an interior of the motor stator, wherein the oil tube is fluidly coupled to the oil sprayer by a cover tube positioned within a cover of the electric motor; and a bypass valve fluidly coupled in parallel with a heat exchanger and configured to control an amount of the oil that passes through the heat exchanger prior to being delivered to the oil sprayer, wherein:

in a low-temperature mode while the oil is below a first predetermined temperature, the bypass valve is configured to open, causing the oil to bypass the heat exchanger, and in a high-temperature mode while the oil is below a second predetermined temperature greater than the first predetermined temperature, the bypass valve is configured to close, causing the oil to be directed through the heat exchanger.

2. The electric motor of claim 1, wherein the motor stator is configured to generate zero torque in the motor rotor during the oil warming mode of the oil.

3. The electric motor of claim 2, further comprising a motor drive electrically coupled to the motor stator, the motor drive configured to induce a current in the motor stator in the oil warming mode of the oil while the motor rotor remains static during the oil warming mode.

4. The electric motor of claim 3, wherein the motor drive is an inverter and the inverter is configured to induce a current injection with a fixed magnitude along a d-axis such that the zero torque is generated in the motor rotor.

5. The electric motor of claim 1, wherein the oil warming mode of the oil is initiated in response to the oil being within a predetermined temperature range.

6. The electric motor of claim 1, wherein the oil tube is positioned in the motor rotor.

* * * * *